United States Patent
Howe

(10) Patent No.: US 11,758,859 B2
(45) Date of Patent: Sep. 19, 2023

(54) MODULAR AEROPONICS ASSEMBLY

(71) Applicant: GROBRIX PTE. LTD., Singapore (SG)

(72) Inventor: Mathew Robert Howe, Singapore (SG)

(73) Assignee: GROBRIX PTE. LTD., Singapore (SG)

(*) Notice: Subject to any disclaimer, the term of this patent is extended or adjusted under 35 U.S.C. 154(b) by 0 days.

(21) Appl. No.: 17/734,032

(22) Filed: Apr. 30, 2022

(65) Prior Publication Data
US 2022/0400635 A1    Dec. 22, 2022

(30) Foreign Application Priority Data

Jun. 21, 2021 (SG) .......................... 10202106748Y

(51) Int. Cl.
*A01G 31/06* (2006.01)
(52) U.S. Cl.
CPC .................... *A01G 31/06* (2013.01)
(58) Field of Classification Search
CPC ........ A01G 31/06; A01G 9/022; A01G 9/023; A01G 9/025; A01G 9/0295; A01G 2009/003; A47B 88/70; A47B 88/75; A47B 88/95; A47B 87/0284; A47B 87/0292; A47B 2210/19
See application file for complete search history.

(56) References Cited

U.S. PATENT DOCUMENTS

| | | | | |
|---|---|---|---|---|
| 7,958,671 B2* | 6/2011 | Sheaffer | ........... | A01G 9/02 47/65.5 |
| 8,776,433 B2* | 7/2014 | Huang | ........... | A01G 31/06 47/82 |
| 8,950,112 B2* | 2/2015 | Dos Santos | ........... | A01G 9/025 47/82 |
| 10,701,870 B2* | 7/2020 | Zhou | ........... | A01G 9/025 |
| 10,874,065 B2* | 12/2020 | Mcguinness | ........... | A01G 9/023 |
| 2010/0146855 A1* | 6/2010 | Ma | ........... | A01G 9/025 47/82 |
| 2011/0219689 A1* | 9/2011 | Hodson-Walker | ........... | E02D 29/0216 47/66.7 |
| 2013/0104456 A1* | 5/2013 | Smith | ........... | A01G 9/02 47/66.7 |
| 2021/0007301 A1* | 1/2021 | Do | ........... | A01G 27/04 |

* cited by examiner

*Primary Examiner* — Monica L Perry
*Assistant Examiner* — Katherine Anne Kloecker
(74) *Attorney, Agent, or Firm* — Ryan Alley IP

(57) ABSTRACT

This invention discloses a modular aeroponics assembly. The assembly comprises base section and a planter section atop the base section. The planter section comprises modular drawers which hold planter pods. The base section comprises a reservoir configured to hold water and nutrients. A plurality of full complete modular drawer assemblies are stacked one top the other to form a single rack assembly. A plurality of such single rack assemblies are stacked side by side to form a multi-rack assembly. Planter pods, which hold plants, are aligned along an axis which is angularly displaced, operatively outwards, about a vertical axis. Noise dampeners are provided just adjacent to each corresponding planter pod. Use of incline geometry, in conjunction with noise dampeners, substantially eliminates noise, wastage, and inefficiencies caused due to water falling upon water and/or water hitting solid.

17 Claims, 16 Drawing Sheets

MODULAR AEROPONICS ASSEMBLY

RELATED APPLICATIONS

This application claims priority under 35 U.S.C. § 119 to SG Application 10202106748Y, filed Jun. 21, 2021. This Singapore application is incorporated by reference herein in their entireties.

FIELD

This invention relates to the field of mechanical engineering and agricultural engineering. Specifically, this invention relates to a modular aeroponics assembly.

BACKGROUND

The term, 'aeroponics', refers to a process of growing plants in an air or a mist environment without use of soil or an aggregate medium. Aeroponic culture differs from conventional hydroponics and aquaponics.

The basic principle of aeroponic growing is to grow plants suspended in a closed or semi-closed environment by spraying the plant's dangling roots and lower stem with an atomized, sprayed, or dripped, nutrient-rich water solution.

SUMMARY

An object of the invention is to improve floor space consumption.

Another object of the invention is to improve aesthetics.

Yet another object of the invention is to provide a truly modular aeroponics system.

Still another object of the invention is to provide an aeroponics system which is easy to maintain, easy to sanitize, and easy to sterilize.

An additional object of the invention is to provide separation of frame from wet area.

According to this invention, there is provided a modular aeroponics assembly comprises:
  a base section and a planter section atop said base section, in that,
    said planter section comprising one or more modular drawers configured to hold planter pods;
    said base section comprising a reservoir configured to hold water and nutrients to be fed to said planter section;
  a modular frame structure, configured to ensconce said modular drawers within said modular frame structure, said modular frame structure ensuring that said assembly is an operatively vertical, floor standing structure, each of said modular drawers comprising at least a top drawer sub-assembly and at least a corresponding bottom drawer sub-assembly, which fit with respect to each other to form one full complete modular drawer assembly, along with planter pods, configured to hold plants, such that there is established a cascaded channelized flow, of water and nutrients, from a top drawer sub-assembly to its corresponding bottom drawer sub-assembly to a consecutively below-located top drawer sub-assembly to its corresponding below-located bottom drawer sub-assembly, sequentially, till said water and nutrients reach said reservoir, in that, said top drawer sub-assembly comprising at least an operative left top drawer sub-assembly and at least an operative right top drawer sub-assembly;
  said bottom drawer sub-assembly comprising at least an operative left bottom drawer sub-assembly and at least an operative right bottom drawer sub-assembly;
  said planter pods being aligned, along an axis which is angularly displaced, operatively outwards, about a vertical axis of a front face of said drawer assembly;
  one or more noise dampeners being provided at a base of each of said operative bottom drawer sub-assemblies just adjacent to each corresponding planter pod thereby providing each planter pod with an associated noise dampener located adjacently and operatively below it; and
  an incline geometry configured by providing an inclined surface against a back wall of each of said top drawer sub-assemblies, said incline geometry being defined by an inclined wall, forming a channel, starting from the one or more bottom holes of a top drawer sub-assembly and ending with its corresponding noise dampener.

In at least an embodiment, said modular frame structure comprises one or more repeating parts comprising:
  at least a horizontal framework forming an operative top horizontal support and an operative bottom horizontal support;
  at least a vertical framework forming an operative left vertical support and an operative right vertical support;
  in that, each horizontal framework, together, with a corresponding said vertical framework forms a box-like framework to receive and support a modular drawer within it;
  an operative left arm;
  an operative right arm;
  an operative left elongate member, connected from an operative left vertical support, protruding angularly outwards away from said modular frame structure and towards a person facing said frame structure;
  an operative right elongate member, connected from an operative right vertical support, protruding angularly outwards away from said modular frame structure and towards a person facing said frame structure; and
  a handle member, incorporating a light element, configured to join said operative left elongate member and said operative right elongate member.

In at least an embodiment, said modular drawers are made of polypropylene for its UV resistance and food safety characteristics.

In at least an embodiment, each of said planter pods is a cup shaped assembly with:
  its operative lower portion receiving support from a front panel of said drawer sub-assembly, in that, its operative upper portion protruding outwards and away from said front panel of said drawer sub-assembly;
  a substantial portion of a base, of each of said planter pods, being inside said drawer sub-assembly; and
  its operative top portion from which plants grow and protrude out of the drawer sub-assembly.

In at least an embodiment, each of said planter pods have a body with longitudinal slits about its circumference so as to receive water and nutrients into said planter pods via said slits.

In at least an embodiment, the assembly comprises:
  an operative bottom side of an operative top drawer sub-assembly, of each of said modular drawers, comprises a first set of one or more holes; and
  an operative top side, of a bottom surface, of an operative bottom drawer sub-assembly comprises a second set of one or more holes collinear with said first set of one or more holes;

such that water that drips from an adjacent preceding top drawer sub-assembly, through the collinear sets of holes, on to another adjacent subsequent bottom drawer sub assembly;

a downward protruding element being provided, beneath the first set of one or more holes, so as to collect all water and nutrients from that drawer sub-assembly and channel through a single point; and planter pods being located in the line of traverse of water flow from a top drawer sub-assembly to a bottom drawer sub-assembly.

In at least an embodiment, each of said drawer sub-assemblies comprises four adjacently located planter pods, in which two planter pods are on an operative left side of said drawer sub-assembly and in which two planter pods are on an operative right side of the drawer sub-assembly.

In at least an embodiment, a front face of each of said drawer sub-assemblies are broken into:

an operative left side top drawer panel having one or more recesses to hold or provide space for upper portion/s of a corresponding planter pod;

an operative left side bottom drawer panel having one or more recesses to hold or provide space for lower portion/s of a corresponding planter pod;

an operative right side top drawer panel having one or more recesses to hold or provide space for upper portion/s of a corresponding planter pod; and an operative right side bottom drawer panel having one or more recesses to hold or provide space for lower portion/s of a corresponding planter pod.

In at least an embodiment, a plurality of complete modular drawer assemblies are stacked one atop another to form a single rack assembly.

In at least an embodiment, a plurality of complete modular drawer assemblies being stacked one atop another to form a single rack assembly and a plurality of said single rack assemblies being stacked side by side to form a multi-rack assembly.

In at least an embodiment, for each of stack of drawer assemblies, shower heads/nozzles are provided on an operative top panel of only a drawer assembly in order to release water and nutrients such that:

a first channel, receiving said water and nutrients, provided at a height in a topmost drawer sub-assembly of said topmost drawer assembly, for a given stack, from which it flows to an incline channel connected to an end of a first channel, said incline channel causing water and nutrients to flow downwards in a channelized, guided, manner such that there is no splashing around or wayward flow;

a second set of channels comprising at least an operative left side second channel and at least an operative right side second channel, each of said side channels originating from an operative bottom end of said incline channel, causing the water and nutrients received from said incline channel to be split into an operative left side and an operative right side and, further, towards corresponding operative left side holes and operative right side holes from which said water and nutrients drip into corresponding planter pods through their corresponding slits; and each planter pod being located adjacently operative below corresponding holes.

In at least an embodiment, each top drawer sub-assembly comprises said first channel culminating into an incline channel splitting into an operative left side second channel and an operative right side second channel and finally ending with operative left side holes and operative right side holes from which the water and nutrients drip to corresponding planter pods from which said water and nutrients, from said planter pods drip onto a collinearly aligned noise dampeners, operatively below each planter pod.

In at least an embodiment, for each of stack of drawer assemblies, third channels comprises at least an operative left side third channel and at least an operative right side third channel said water and nutrients received by said noise dampeners towards a set of drainage holes, substantially centrally located, on an operative bottom surface of said operative bottom drawer sub-assembly from which said water and nutrients flow onto an incline channel, of the operative top drawer sub-assembly, located just beneath from where it flows further towards said planter pods in a distributed manner.

In at least an embodiment, said modular frame structure is configured with a lighting system such that:

lighting cables being lined along walls of said modular frame structure; and light sources being provided at each drawer assembly to provide necessary optimized lights for plant growth.

In at least an embodiment, said modular frame structure being configured with an irrigation assembly, to ensure that the water and nutrient solution is distributed to all the planter pods, in a top-down fluid flow manner, in that:

water and nutrients being pumped, to said topmost drawer assembly, by means of a pump located in a reservoir which forms a base portion of said irrigation assembly, said reservoir sitting in said base.

In at least an embodiment, said modular frame structure is configured with an irrigation assembly, to ensure that the water and nutrient solution is distributed to all the planter pods, in a top-down fluid flow manner, in that:

shower heads/nozzles being provided under the top panel of only the topmost operative top drawer sub-assembly, of each stack of drawer assemblies, so that the water and nutrient solution, reach the topmost drawer assembly, and are then channeled towards the operative lower drawer assemblies whilst feeding the plants in the planter pods, through the incline geometry and noise dampeners; from an operative top to an operative bottom; and a central pipe, traversing through the drawer assemblies, allows water and nutrient to travel from the bottom reservoir to the topmost drawer assembly, of a stack; specifically, to the shower heads/nozzles of the topmost drawer assembly.

In at least an embodiment, said multi-rack assembly is formed by a plurality of said modular aeroponic assemblies.

BRIEF DESCRIPTION OF THE DRAWINGS

The invention will now be described in relation to the accompanying drawings, in which.

DETAILED DESCRIPTION

There is a need for a truly modular aeroponics system such that it can be maintained, sterilized, sanitized; all without dismantling the entirety of the structure.

There is a need for a truly modular aeroponics system such that there is separation of frame from wet area.

Prior art aeroponic or hydroponic systems require considerable time to clean their components/building blocks; usually through full disassembly which can take hours. There is a need to bring this time down, drastically; since, maintenance is one of the key aspects in vertical indoor gardening systems for ease of adoption.

According to this invention, there is provided a modular aeroponics assembly. This assembly offers a solution to one or more of the aforementioned drawbacks of prior art assemblies.

Figure 1:
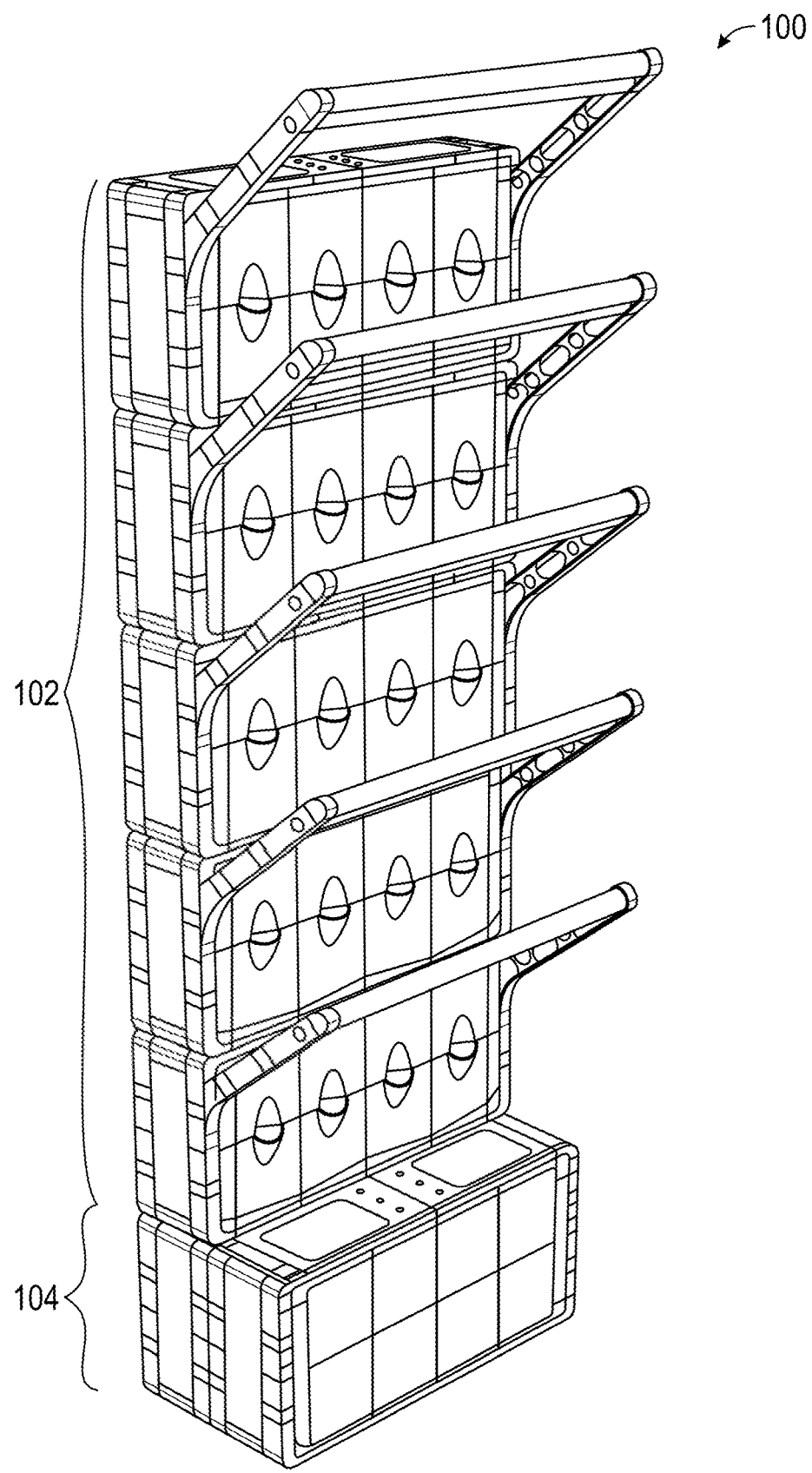
FIG. 1 illustrates a perspective view of the modular aeroponics assembly.

FIG. 1 illustrates a perspective view of the modular aeroponics assembly (100).

Figure 2:
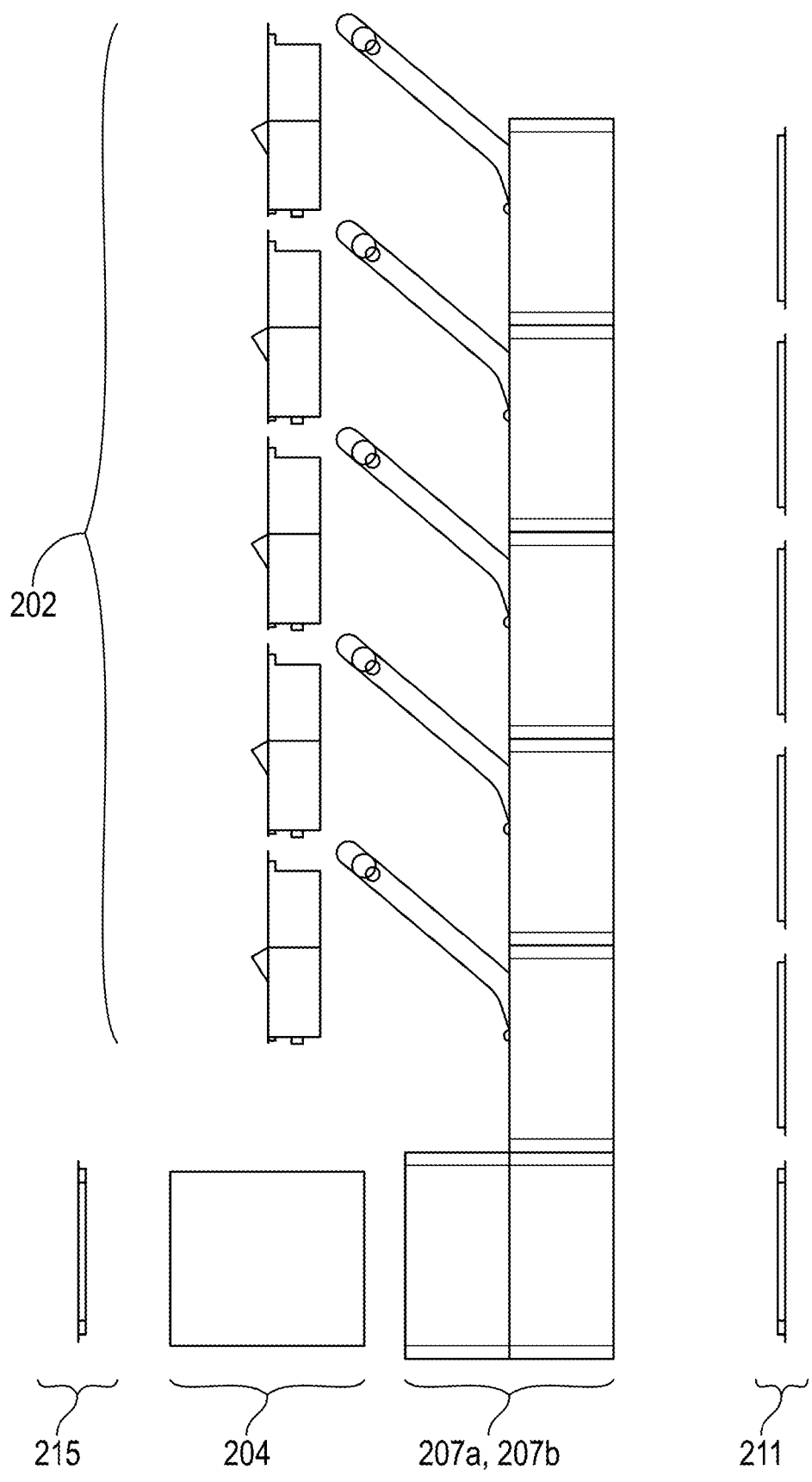
FIG. 2 illustrates an exploded view of the modular aeroponics assembly.

FIG. 2 illustrates an exploded view of the modular aeroponics assembly.

Figure 3:
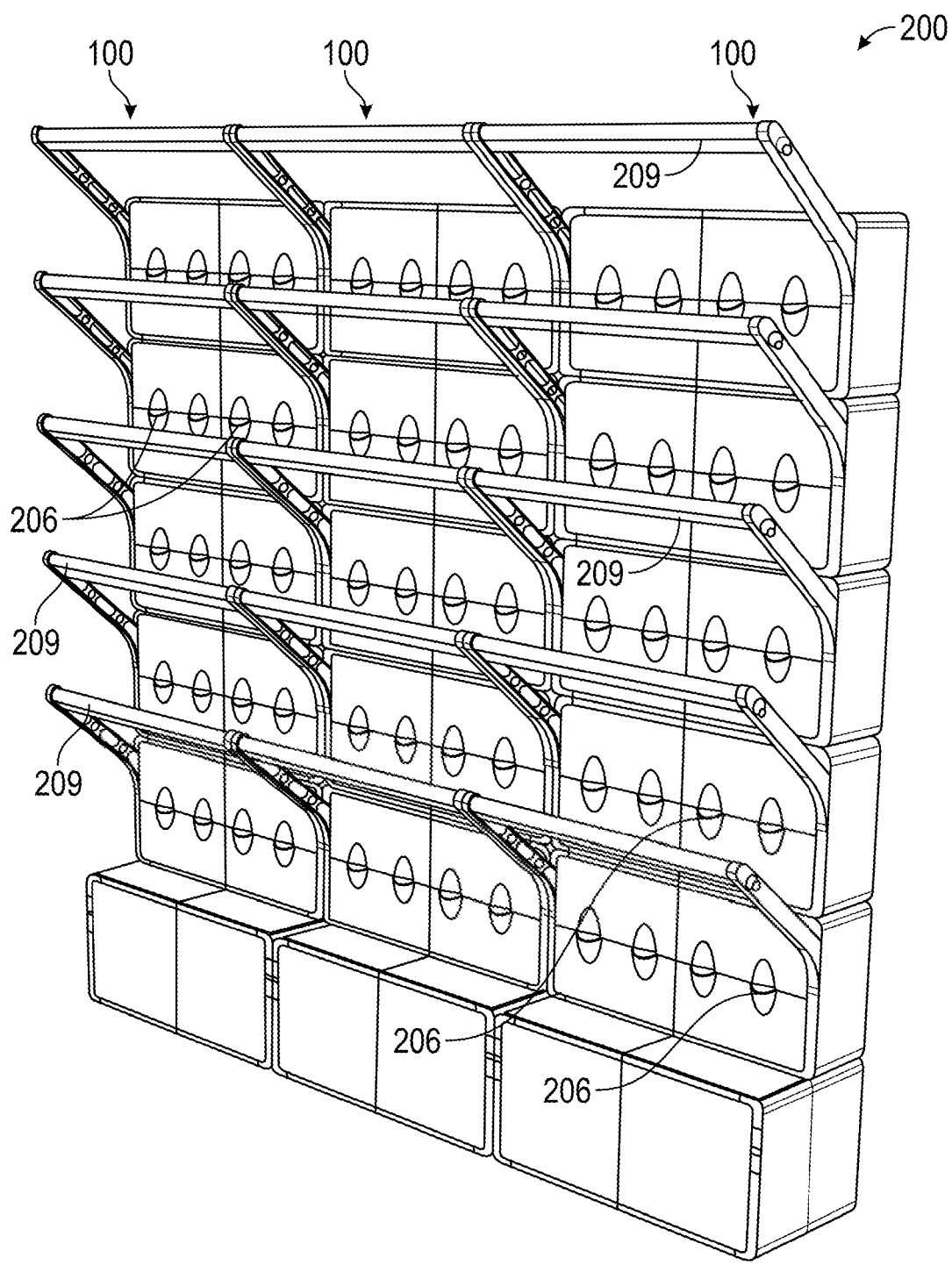
FIG. 3 illustrates a multi-rack assembly formed by a plurality of the modular aeroponic assemblies of FIG. 1.

FIG. 3 illustrates a multi-rack assembly 200 formed by a plurality of the modular aeroponic assemblies 100 of FIG. 1.

In at least an embodiment, the assembly comprises a base section 104 and a planter section 102 atop the base section 104. In at least an embodiment, the planter section 102 comprises modular drawers 202 which hold planter pods 206. In at least an embodiment, the base section 104 comprises a reservoir 204 configured to hold water and nutrients.

In at least an embodiment, the assembly comprises a modular frame structure, in which, the structure ensures that this entire assembly can be a floor standing structure with an option to be anchored to a vertical wall. This frame may be made of ABS material. Typically, the frame structure comprises of at least four repeating parts comprising at least a horizontal framework 207a forming an operative top horizontal support and an operative bottom horizontal support, at least a vertical framework 207b forming an operative left vertical support and an operative right vertical support, an operative left arm 208a, and an operative right arm 208b. Each horizontal framework, together, with the vertical framework forms a box-like framework to receive and support a modular drawer 202 within it. From an operative left vertical support, there is provided an operative left elongate member 208a which protrudes angularly outwards away from the frame structure and towards a person facing this frame structure. From an operative right vertical support, there is provided an operative right elongate member 208b which protrudes angularly outwards away from the frame structure and towards a person facing this frame structure. These two members i.e. an operative left elongate member 208a and an operative right elongate member 208b are joined by a handle member 209 which incorporates a light element (preferably, LEDs) to provide light to plants, for their growth, in planter pods. Once the modular drawer 202 is fit into the frame structure, a back panel 211 closes the frame structure, from its operative back, a front panel 215 closes the frame structure, from its operative front, and a top lid panel 213 closes the frame structure, from its operative top. The frame structure is held in place, by its constituent parts, panels, members, and elements; all be means of various snap fit engagement mechanisms and/or mechanical fastening mechanisms. Using the panels, it ensures that there is aesthetic rationale to the entire assembly, it ensures that insects are kept out, and it ensures that water flow noise as well as pump noise are dampened.

Figure 4:
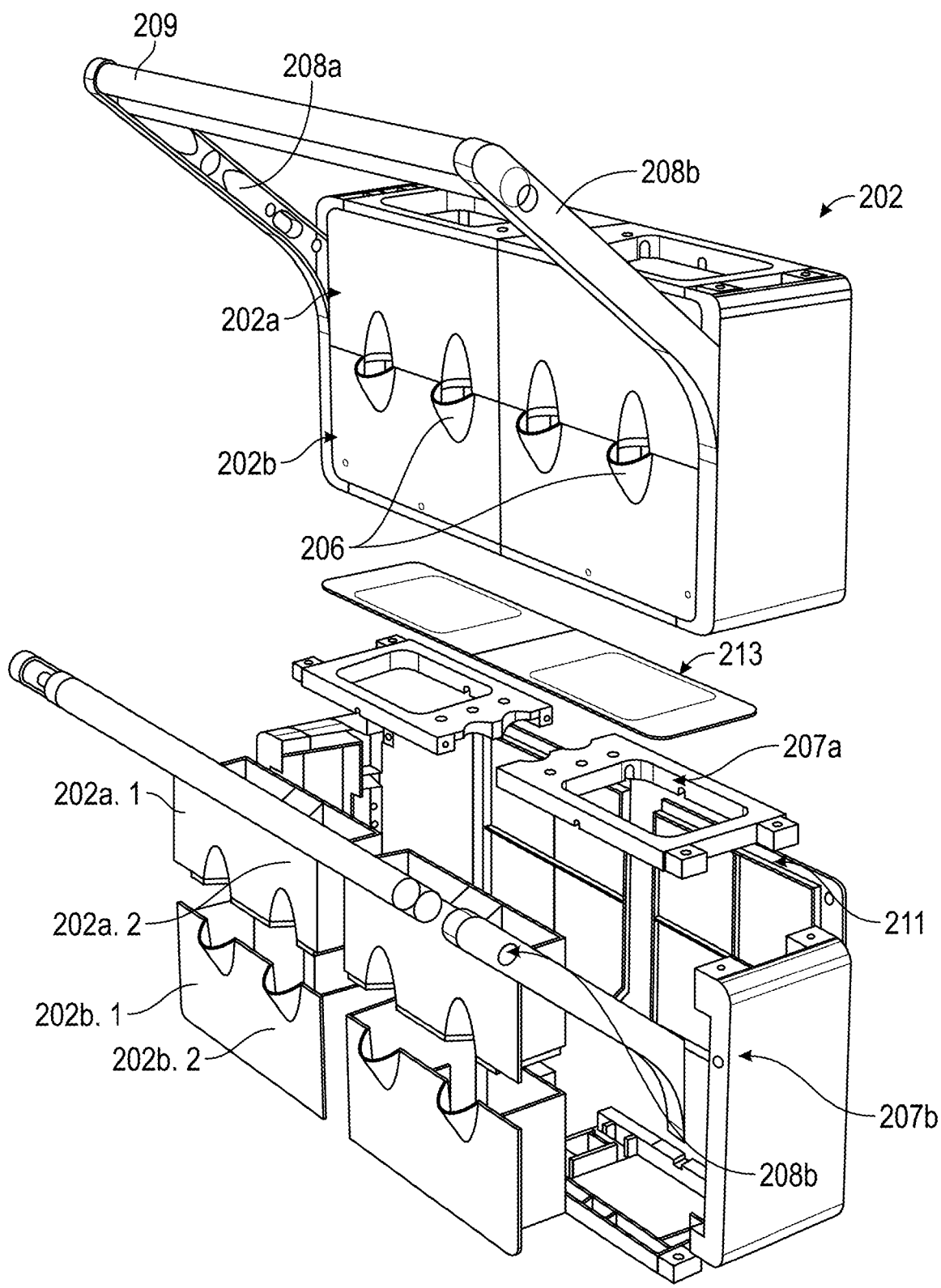
FIG. 4 illustrates an exploded view of the modular drawer assembly.

FIG. 4 illustrates an exploded view of the modular drawer assembly 202.

Figure 5:
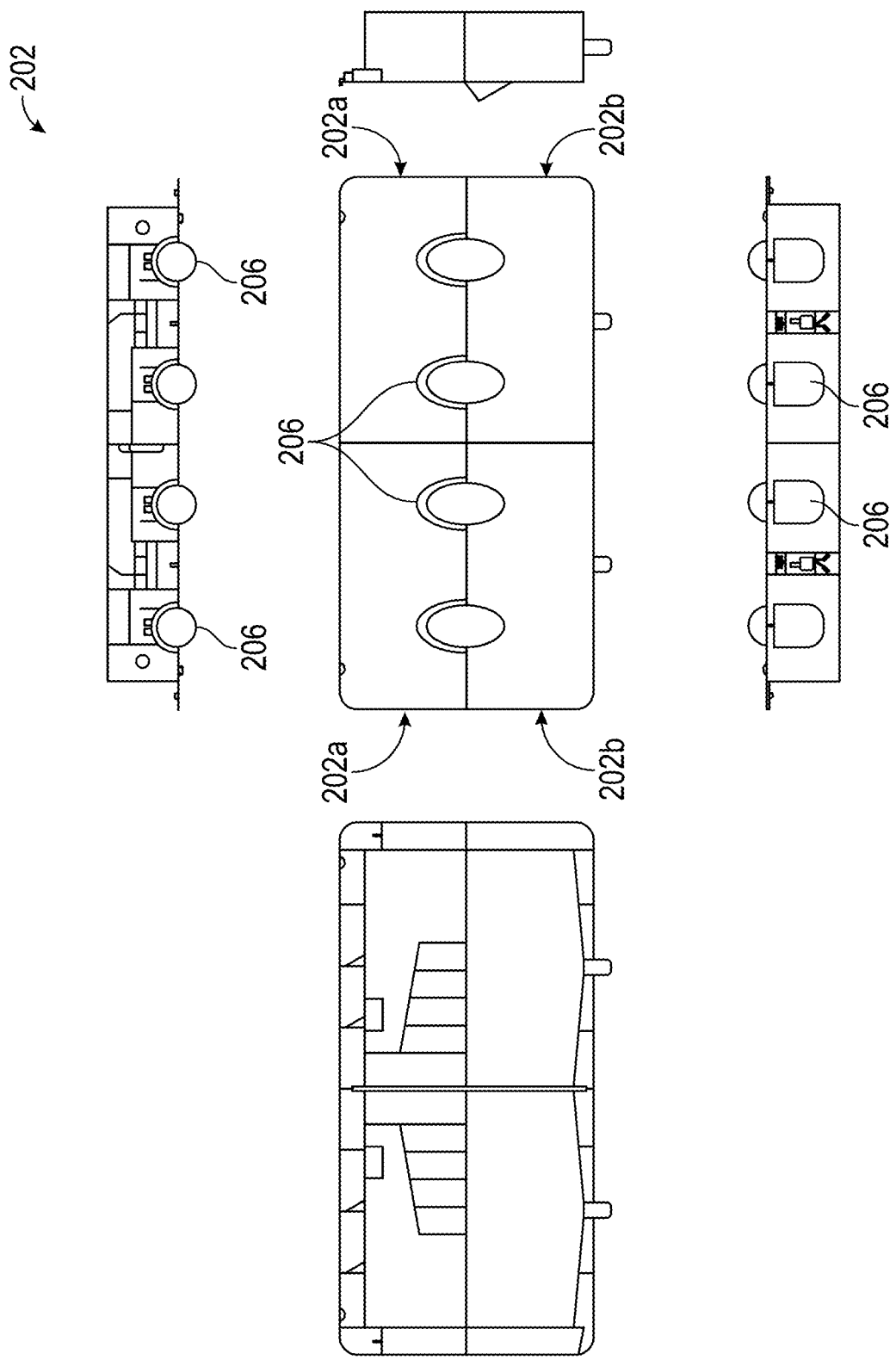
FIG. 5 illustrates various views of the modular drawers.

FIG. 5 illustrates various views of the modular drawers 202.

Figure 6:
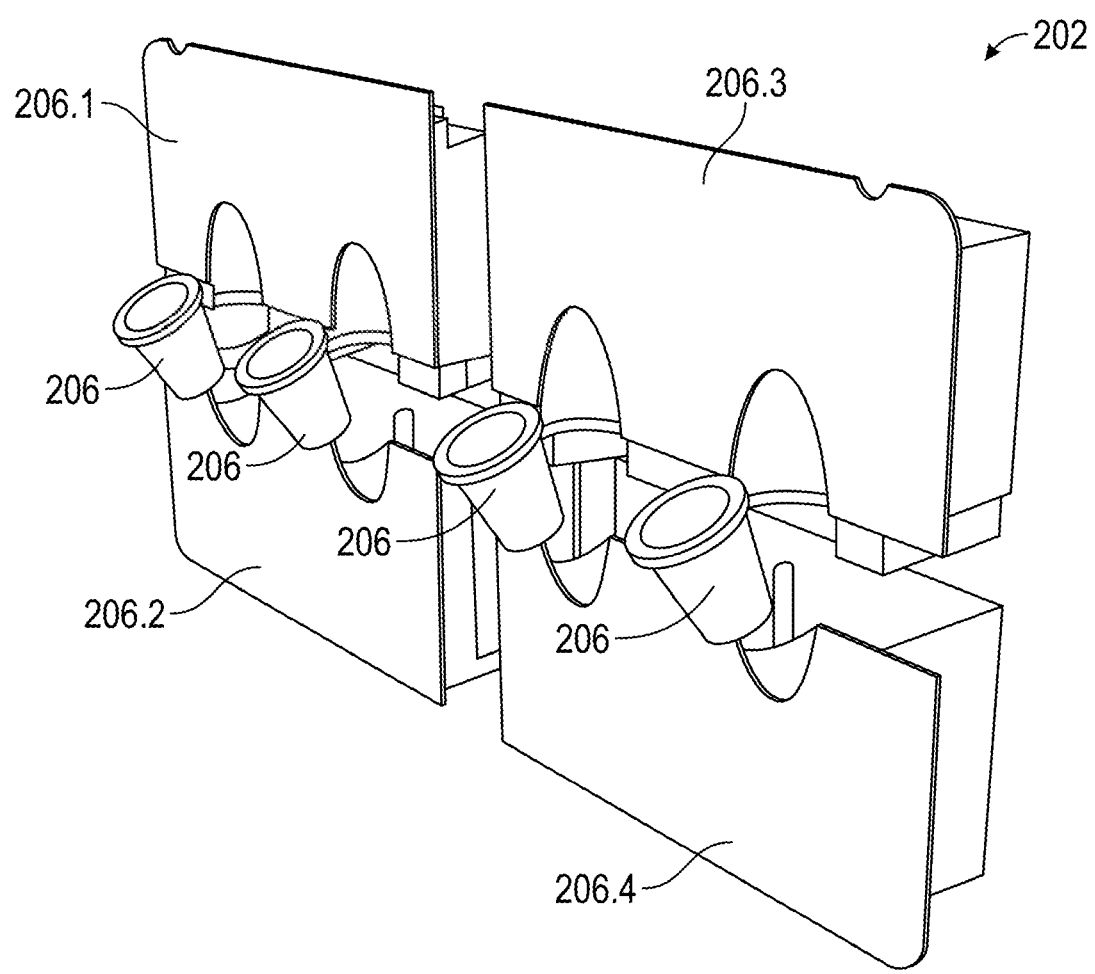
FIG. 6 illustrates an isometric view of modular drawers.

FIG. 6 illustrates an isometric view of modular drawers 202.

In at least an embodiment, the modular drawers 202 comprise at least a top drawer sub-assembly 202a and at least a bottom drawer sub-assembly 202b which fit with respect to each other to form one full complete modular drawer assembly 202. The fitment may be in the form of various snap fit engagement mechanisms and/or mechanical fastening mechanisms. A plurality of such full complete modular drawer assemblies 202 are stacked one top the other to form a single rack assembly 100 as shown in FIG. 1. A plurality of such single rack assemblies 100 are stacked side by side to form a multi-rack assembly 200 as shown in FIG. 2. Each of the modular drawers 202 can be, individually, isolated and removed from the broader modular frame structure within which it is ensconced.

Preferably, the modular drawers 202 are made of polypropylene for its UV resistance and food safety characteristics. It can also be cleaned in the dishwasher.

In at least an embodiment, the top drawer sub-assembly 202a is comprised of an operative left top drawer sub-assembly 202a.1 and an operative right top drawer sub-assembly 202a.2.

In at least an embodiment, the bottom drawer sub-assembly 202b is comprised of an operative left bottom drawer sub-assembly 202b.1 and an operative right bottom drawer sub-assembly 202b.2.

In at least an embodiment, the drawer sub-assembly 202 comprises planter pods 206 which are aligned along an axis which is angularly displaced, operatively outwards, about a vertical axis of a front face of the drawer sub-assembly 202. Typically, each planter pod 206 is a cup shaped assembly with its operative lower portion receiving support from a front panel of the drawer sub-assembly 202 and with its operative upper portion protruding outwards and away from the front panel of the drawer sub-assembly 202. Each plantar pod 206 has a substantial portion of its base inside the drawer sub-assembly 202 and an operative top portion from which plants grow and protrude out of the drawer sub-assembly 202. Each planter pod 206 has a body with longitudinal slits 206a about its circumference so as to receive water and nutrients into the planter pods 206 via the slits. The planter pods 206 are configured to hold plants and to provide growing environment to the held plants.

In preferred embodiments, a standard drawer sub-assembly 202 comprises four adjacently located planter pods 206, in which two planter pods 206 are on an operative left side of the drawer sub-assembly 202 and which two planter pods 206 are on an operative right side of the drawer sub-assembly 202. Specifically, a front face of a drawer sub-assembly 202 is broken intoz:

an operative left side top drawer panel which has one or more recesses 206.1 to hold or provide space for upper portion/s of a corresponding planter pod 206;

an operative left side bottom drawer panel which has one or more recesses 206.2 to hold or provide space for lower portion/s of a corresponding planter pod 206;

an operative right side top drawer panel which has one or more recesses 206.3 to hold or provide space for upper portion/s of a corresponding planter pod 206;

an operative right side bottom drawer panel which has one or more recesses 206.4 to hold or provide space for lower portion/s of a corresponding planter pod 206.

The various panels are held together with dove tail and interference fit mechanisms and can be disassembled for ease of sanitization and sterilization in a dishwasher In at least an embodiment, an operative bottom side of an operative top drawer sub-assembly 202a comprises a first set of one or more holes and an operative top side, of a bottom surface, of an operative bottom drawer sub-assembly 202b comprises a second set of one or more holes collinear with the first set of one or more holes; such that water that drips from an adjacent preceding top drawer sub-assembly 202a is passed, through the collinear sets of holes, on to another adjacent subsequent bottom drawer sub assembly 202b. Beneath the first set of one or more holes, a downward protruding element 213 is provided so as to collect all the water and nutrients from that drawer sub-assembly and channel is through a single point. While the water drips from a top drawer sub-assembly 202a to a bottom drawer sub-assembly 202b, it is interjected by the planter pods 206 that are located in the line of traverse of the water flow from top to bottom.

Figure 7A:
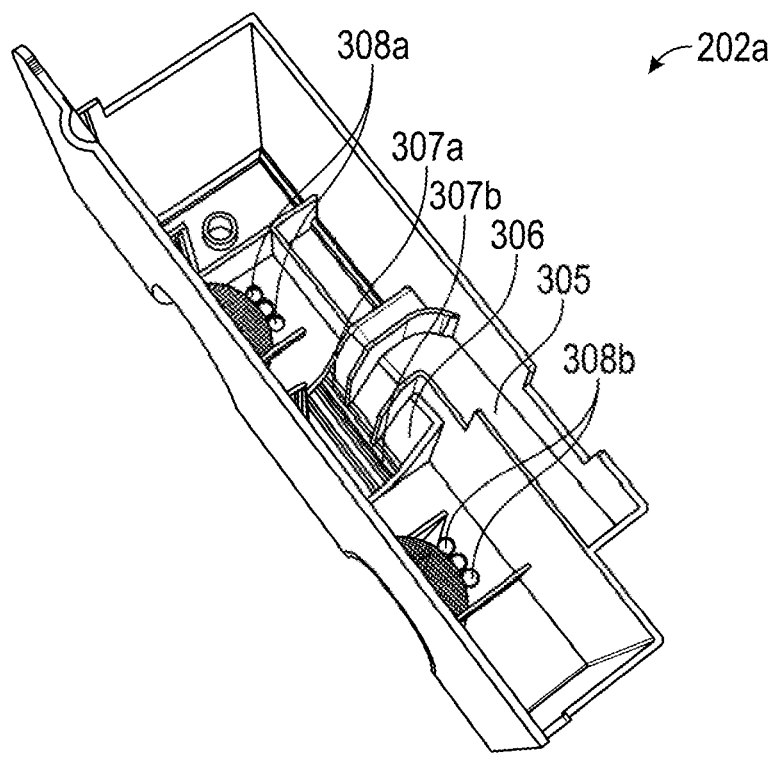
FIG. 7a illustrates a top drawer sub-assembly showing channeling of water.

FIG. 7a illustrates a top drawer sub-assembly 202a showing channeling of water.

Figure 7B:
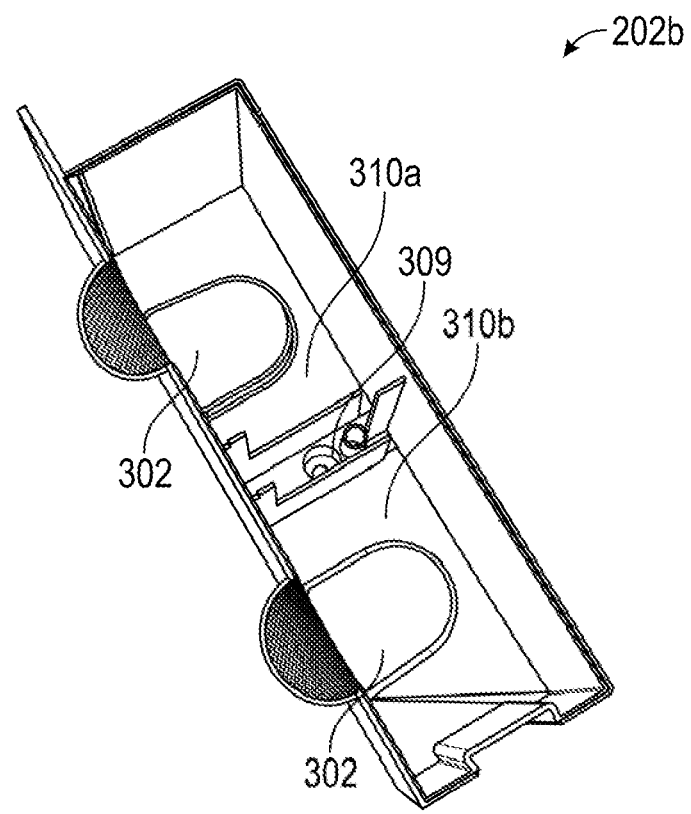
FIG. 7b illustrates a bottom drawer sub-assembly showing channeling of water.

FIG. 7b illustrates a bottom drawer sub-assembly 202b showing channeling of water.

In at least an embodiment, one or more noise dampeners 302 are provided at a base of each of the operative bottom drawer sub-assemblies 202b just adjacent to each corresponding planter pod 206; thus, each planter pod 206 has an associated noise dampener 302 located adjacently and operatively below it. It was observed by the inventors, in prior art assemblies, that when water (along with nutrients) fall from top to bottom, there is a splash, with considerable noise, resulting in wastage and inefficiencies of flow as well as the noise occurring due to such splash is substantially higher when this entire modular aeroponics assembly is used for the purposes of indoor environments. To eliminate such noise, wastage, and inefficiencies, an incline geometry 304, in conjunction with noise dampeners 302, for channeling and assisting flow, of water and nutrients has been proposed in this invention. The use of this incline geometry 304, in conjunction with noise dampeners 302, substantially eliminates noise, wastage, and inefficiencies caused due to water falling upon water and/or water hitting solid.

In at least an embodiment, the incline geometry 304 is configured by providing an inclined surface against a back wall of each of the top drawer sub-assemblies 202a, the inclined wall, forming a channel, starting from the one or more bottom holes of a top drawer sub-assembly 202a and ending with the corresponding noise dampener 302. Typically, in a given stack of drawer assemblies, in the topmost drawer assembly, shower heads/nozzles 504 release water and nutrients which fall onto a first channel 305 provided at a height in the topmost drawer sub-assembly 202a of the topmost drawer, for a given stack, from which it flows to an incline wall/incline channel 306 connected to an end of the first channel 305; this incline wall/incline channel 306 causes water and nutrients to flow downwards in a channelized, guided, manner such that there is no splashing around or wayward flow. A second set of channels i.e. an operative left side second channel 307a and an operative right side second channel 307b; both, originating from the operative bottom end of the incline wall/incline channel 306, cause the water and nutrients received from the incline wall/incline channel 306 to be split into operative left side and operative right side and further towards corresponding operative left side holes 308a and operative right side holes 308b from which the water and nutrients drip. The dripping of the water and nutrients is into the planter pods 206, through their slits 206a to reach the roots of plants in the planter pods; each planter pod 206 being located adjacently operative below corresponding holes 308a, 308b. Thus, each top drawer sub-assembly 202a comprises the first channel 305 culminating into an incline wall/incline channel 306 splitting into an operative left side second channel 307a and an operative right side second channel 307b and finally ending with operative left side holes 308a and operative right side holes 308b from which the water and nutrients drip to corresponding planter pods 206. From here, the water and nutrients, from the planter pods 206 drip onto a collinearly aligned noise dampeners 302, operatively below each planter pod 206. Further, third channels i.e. operative left side third channel 310a and operative right side third channel 310b channel the water and nutrients received by the noise dampeners 302 towards a set of drainage holes 309, substantially centrally located, on the operative bottom surface of the operative bottom drawer sub-assembly 202b from which the water and nutrients flow onto an incline wall/incline channel 306, of the operative top drawer sub-assembly 202a, located just beneath from where it flows further towards the planter pods 206 in a distributed manner. Thus, a cascaded channelized flow of water and nutrients is established from a first top sub-drawer assembly to its corresponding first bottom sub-drawer assembly to a second top sub-drawer assembly to its corresponding second bottom sub-drawer assembly and so on and so forth till the water and nutrients reach the reservoir 204.

This entire incline geometry, along with the noise dampeners, eliminates water hitting water (and nutrients) and water (and nutrients) hitting hard surfaces.

Figure 8C:
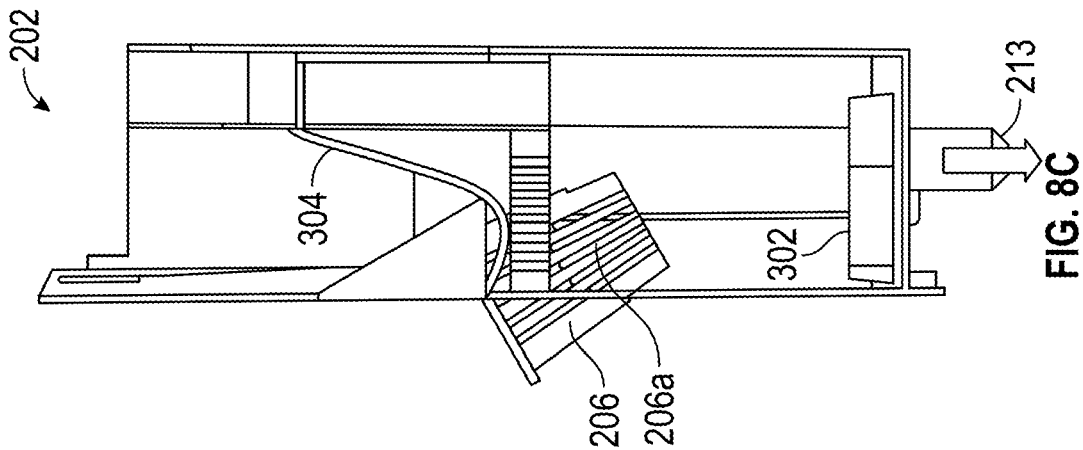
FIGS. 8a, 8b, and 8c illustrate, flow of water and nutrients, in a front section view, of the drawer system.
Figure 8B:
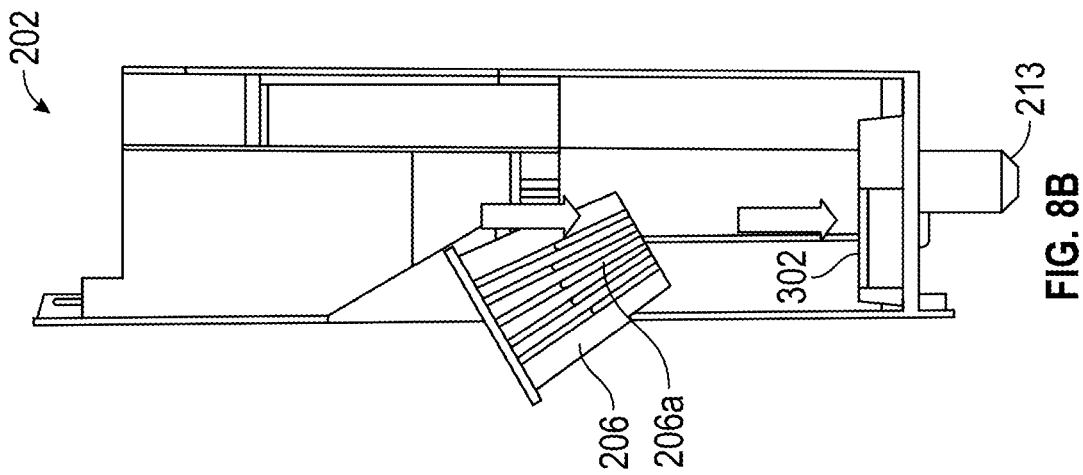
Figure 8A:
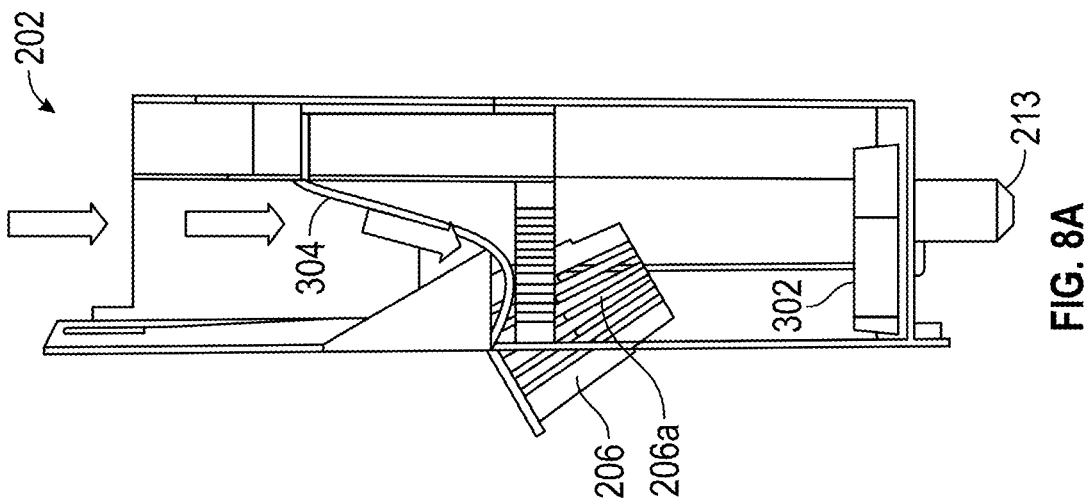

FIGS. 8a, 8b, and 8c illustrate, flow of water and nutrients, in a front section view, of the drawer system.

Figure 9A:
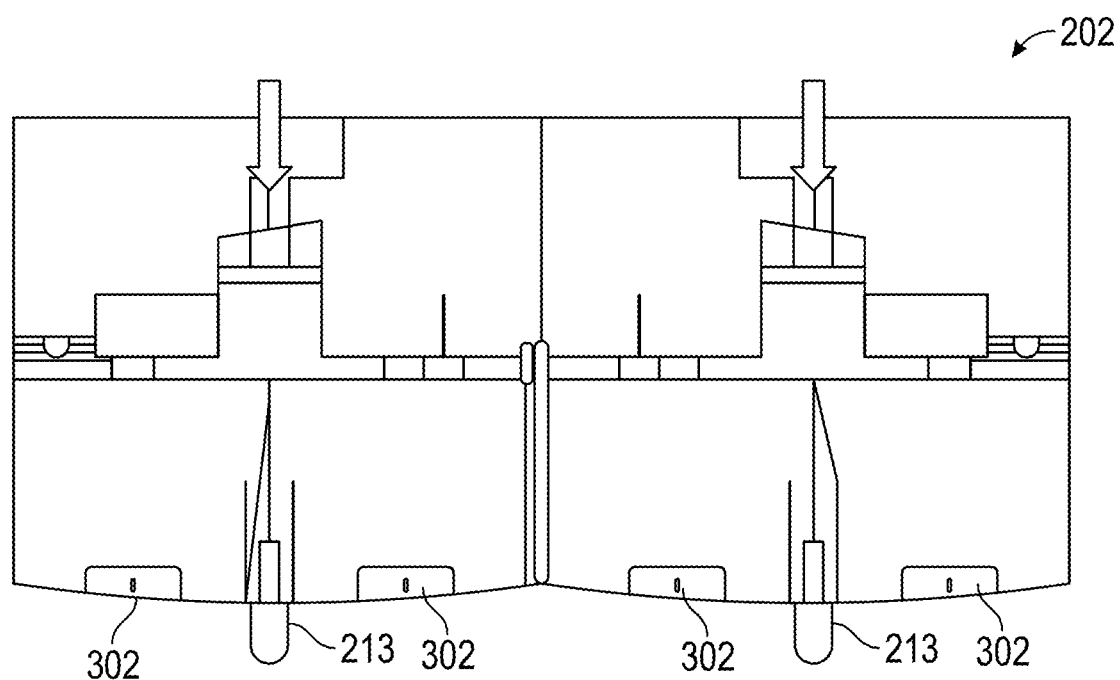
FIGS. 9a, 9b, and 9c illustrate a drawer slide section flow diagram of the drawer system.
Figure 9B:
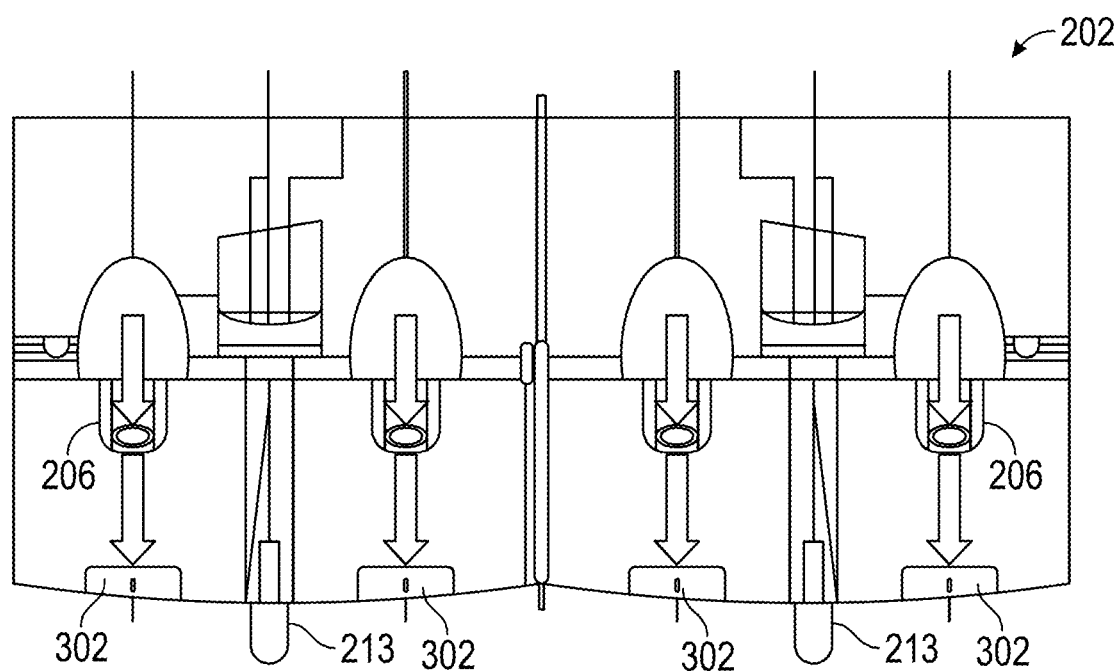
Figure 9C:
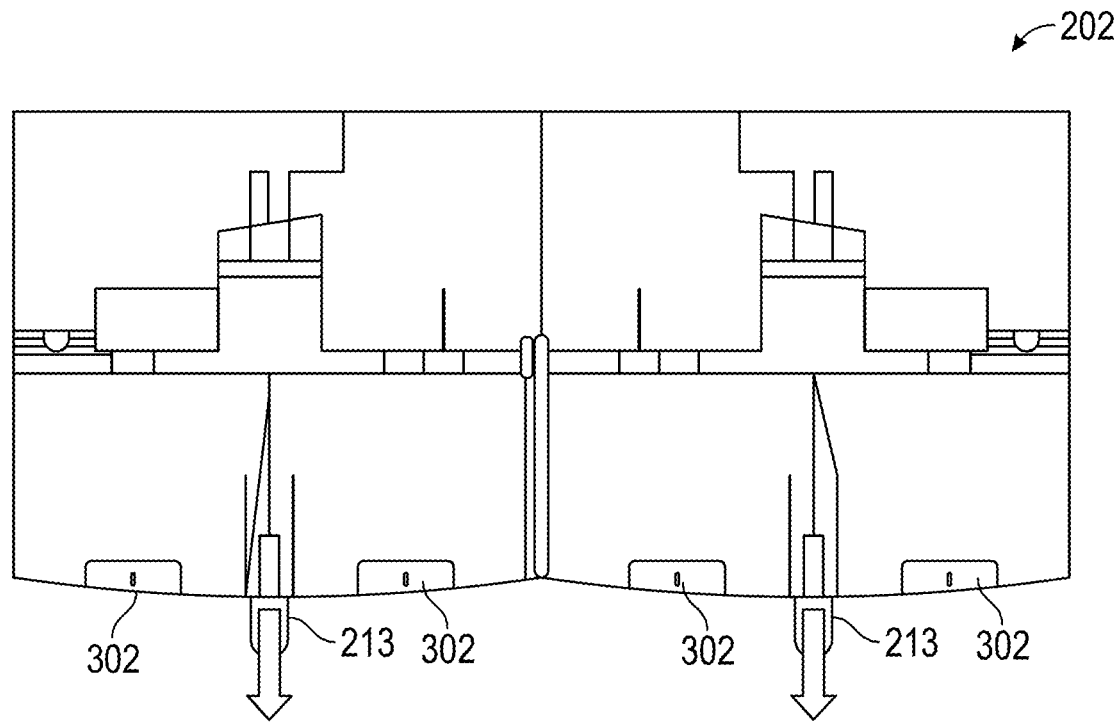

FIGS. 9a, 9b, and 9c illustrate a drawer slide section flow diagram of the drawer system.

FIGS. 8a and 9a illustrate flow (by way of arrows) of water and nutrient solution from an operative top modular drawer sub-assembly, through an incline plane/incline wall 304, to dampen noise.

FIGS. 8b and 9b illustrate flow (by way of arrows) of water and nutrient solution of distributed planter pods (holding plants) to pass through to the operative bottom modular drawer sub-assembly and, in doing so, feeding the plants by nourishing their roots. Water and nutrient solution, then, falls to raised noise dampener 302 to dampen drip noise.

FIGS. 8c and 9c illustrate flow (by way of arrows) of water and nutrient solution passing to a modular drawer sub-assembly below or back to the reservoir 204.

This entire assembly of drawers is such that it provides a functionality to pass water and nutrient solution from a first drawer assembly 202 to a second drawer assembly 202 located below the first drawer assembly 202 due to gravity until finally returning the nutrients that are not absorbed by the plants to the reservoir 204. The cycle continues.

Figure 10:
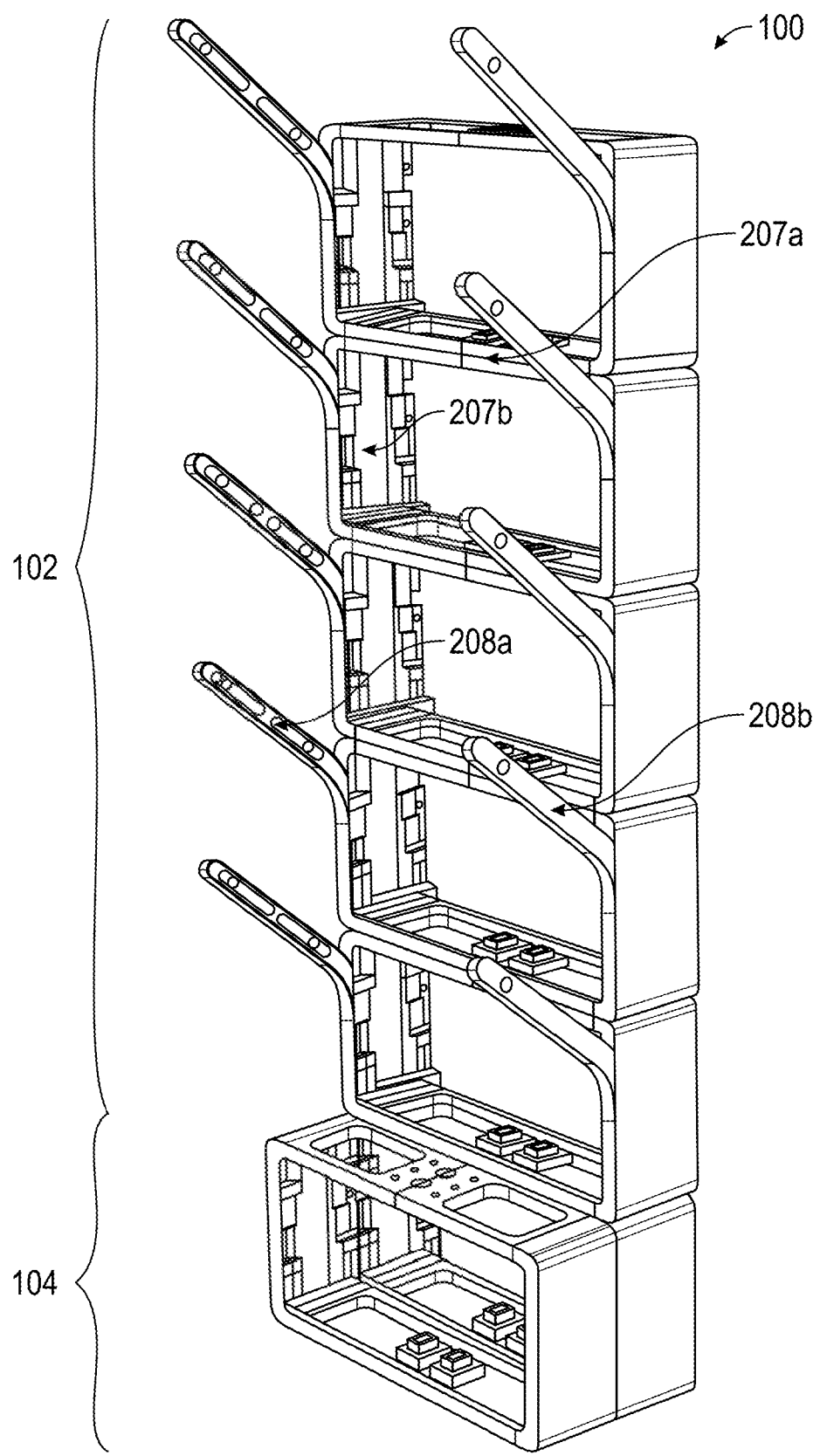
FIG. 10 illustrates a front perspective view of the modular aeroponic frame assembly.

FIG. 10 illustrates a front perspective view of the modular aeroponic frame assembly.

Figure 11:
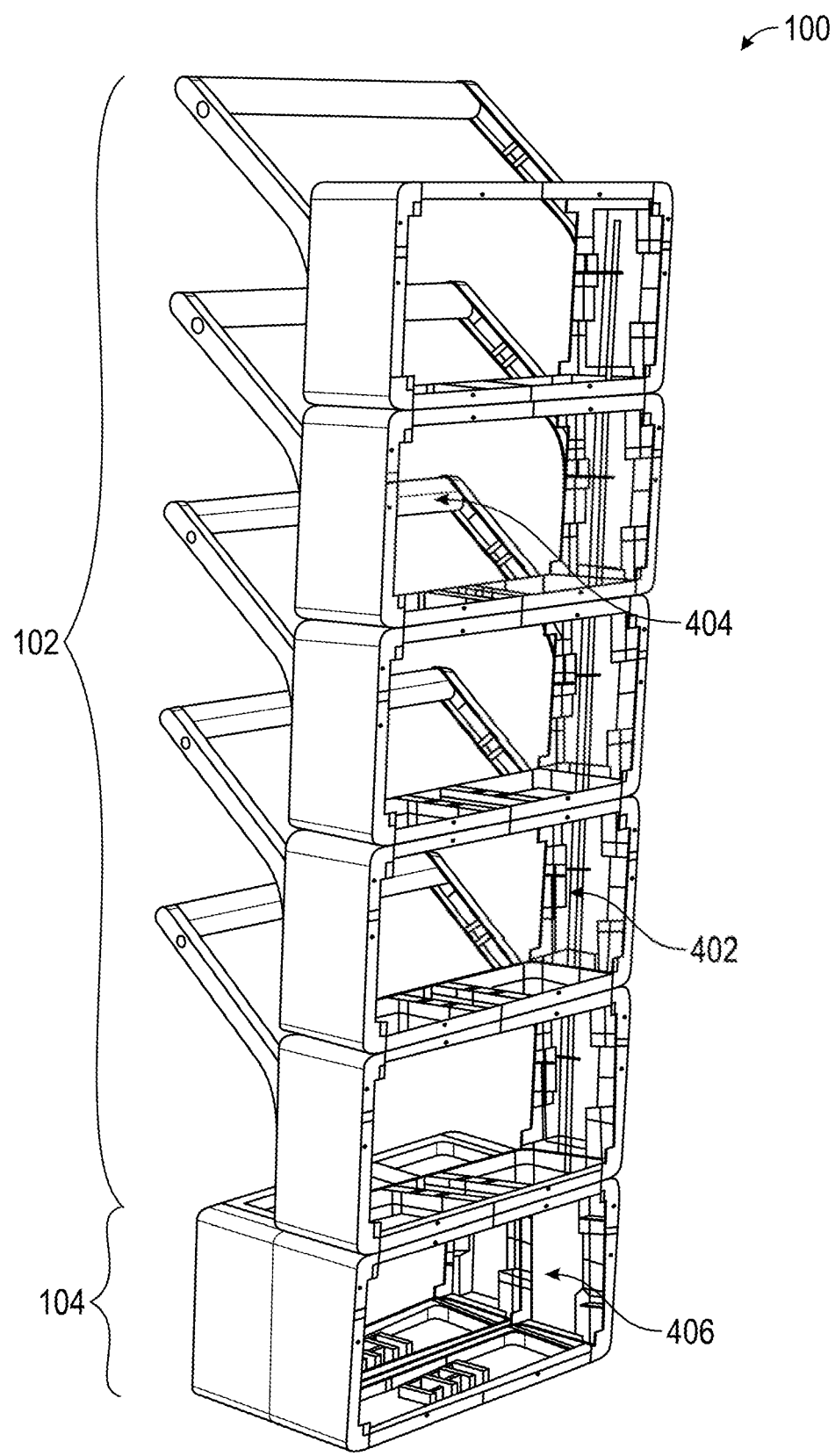
FIG. 11 illustrates a back perspective view, showing lighting, of the modular aeroponics assembly.

FIG. 11 illustrates a back perspective view, showing lighting, of the modular aeroponics assembly.

In at least an embodiment, the modular frame structure is configured with a lighting system such that lighting cables 402 are lined along walls of the modular frame structure. Reference numeral 406 refers to a power supply for such lights. Light sources (preferably, LEDs) 404 are provided at each drawer assembly to provide necessary optimized lights for plant growth.

Figure 12:
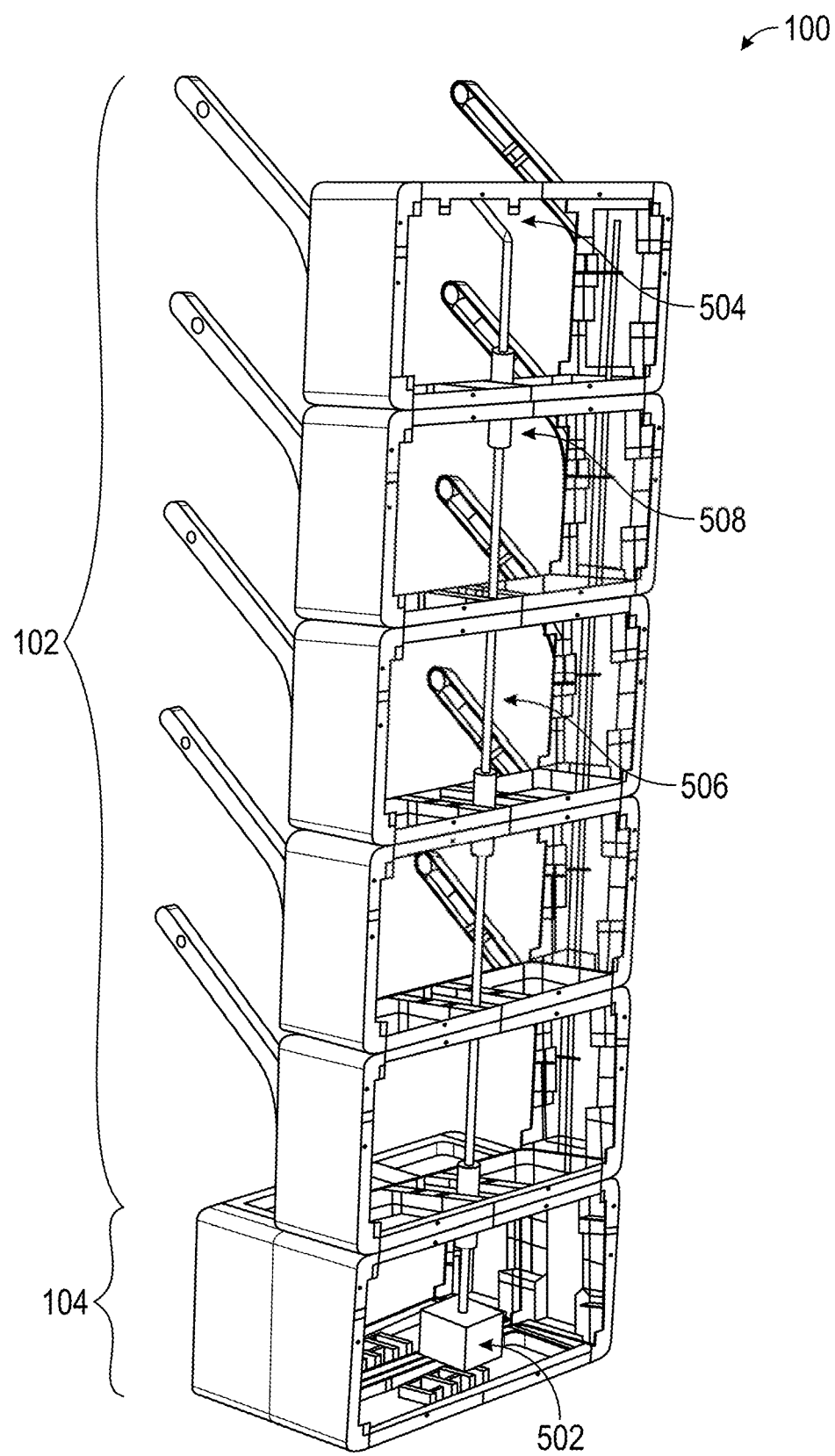
FIG. 12 illustrates a back perspective view, showing irrigation, of the modular aeroponics assembly.

FIG. 12 illustrates a back perspective view, showing irrigation, of the modular aeroponics assembly.

Figure 13:
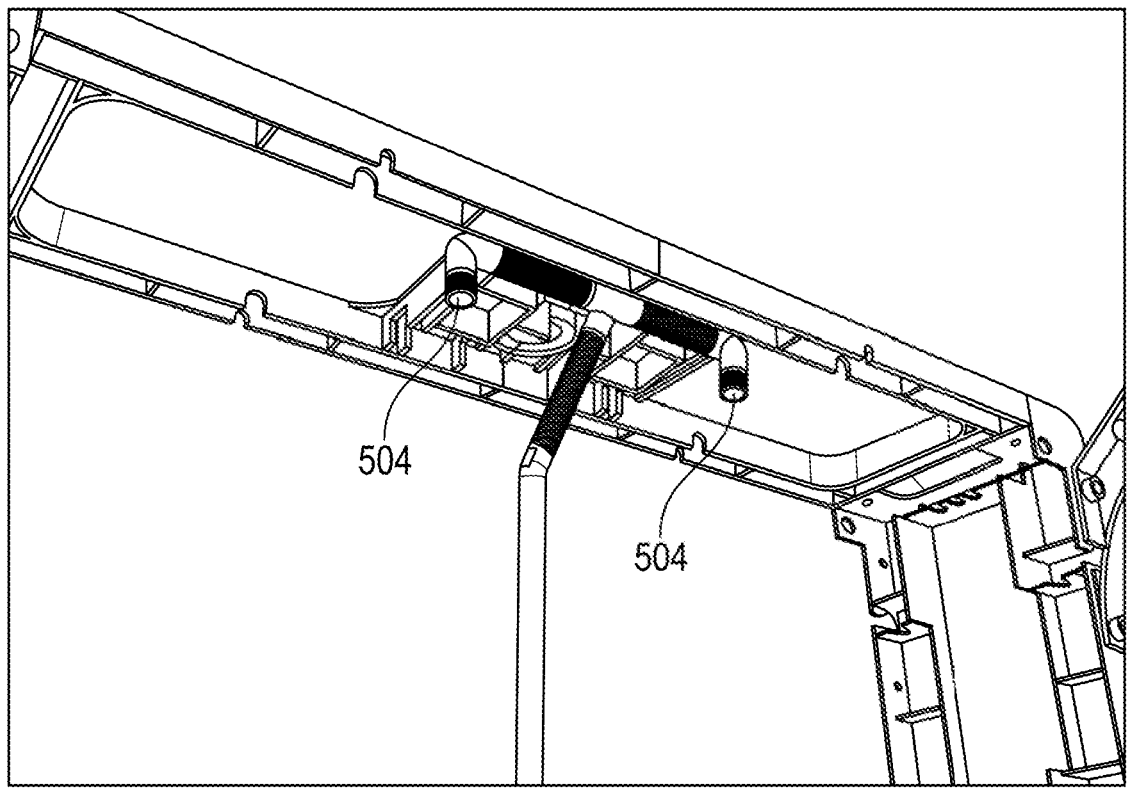
FIG. 13 illustrates an irrigation shower mount of the modular aeroponic assembly.

FIG. 13 illustrates an irrigation shower mount of the modular aeroponic assembly.

In at least an embodiment, the modular frame structure is configured with an irrigation assembly such that water and nutrients is pumped, to the topmost drawer assembly, by means of a pump 502 located in the reservoir 204 which forms a base portion of the irrigation assembly of this invention. The irrigation assembly ensures that the water and nutrient solution is distributed to all the planter pods 206, in a top-down fluid flow manner. The reservoir 204 sits in the base 104 and can be isolated and removed from the modular frame structure.

In at least an embodiment of the irrigation assembly, there are provided shower heads/nozzles 504 under the top panel of only the topmost operative top drawer sub-assembly 202a, of each stack of drawer assemblies, so that the water and nutrient solution, reach the topmost drawer assembly, and are then channeled towards the operative lower drawer assemblies whilst feeding the plants in the planter pods 206, through the incline geometry 304 and noise dampeners 302; from an operative top to an operative bottom. A central pipe 506, traversing through the drawer assemblies, allows water and nutrient to travel from the bottom reservoir 204 to the topmost drawer assembly, of a stack; specifically, to the shower heads/nozzles 504 of the topmost drawer assembly. Reference numeral 508 refers to pipe fittings.

The irrigation assembly, as envisaged in this invention, ensures that the wet areas are separate from the structure and be removed with ease for purposes of cleaning. This is to ease and simplify sanitization and sterilization. The wet areas include the drawer assemblies 202, the reservoir 204, and the irrigation system 502, 504, 506, 508. By separating these from the modular frame structure 207a, 207b, 208a, 208b, 209, this invention allows maintenance, sterilization, and sanitization without having to dismantle the entire assembly. In other words, this invention allows for piecemeal dismantling of its items, elements, assemblies, sub-assemblies, components, parts, or members; eventually, this results in massive savings in time and provides for greater adoption of indoor soilless farming in an urban setting.

Figure 14:
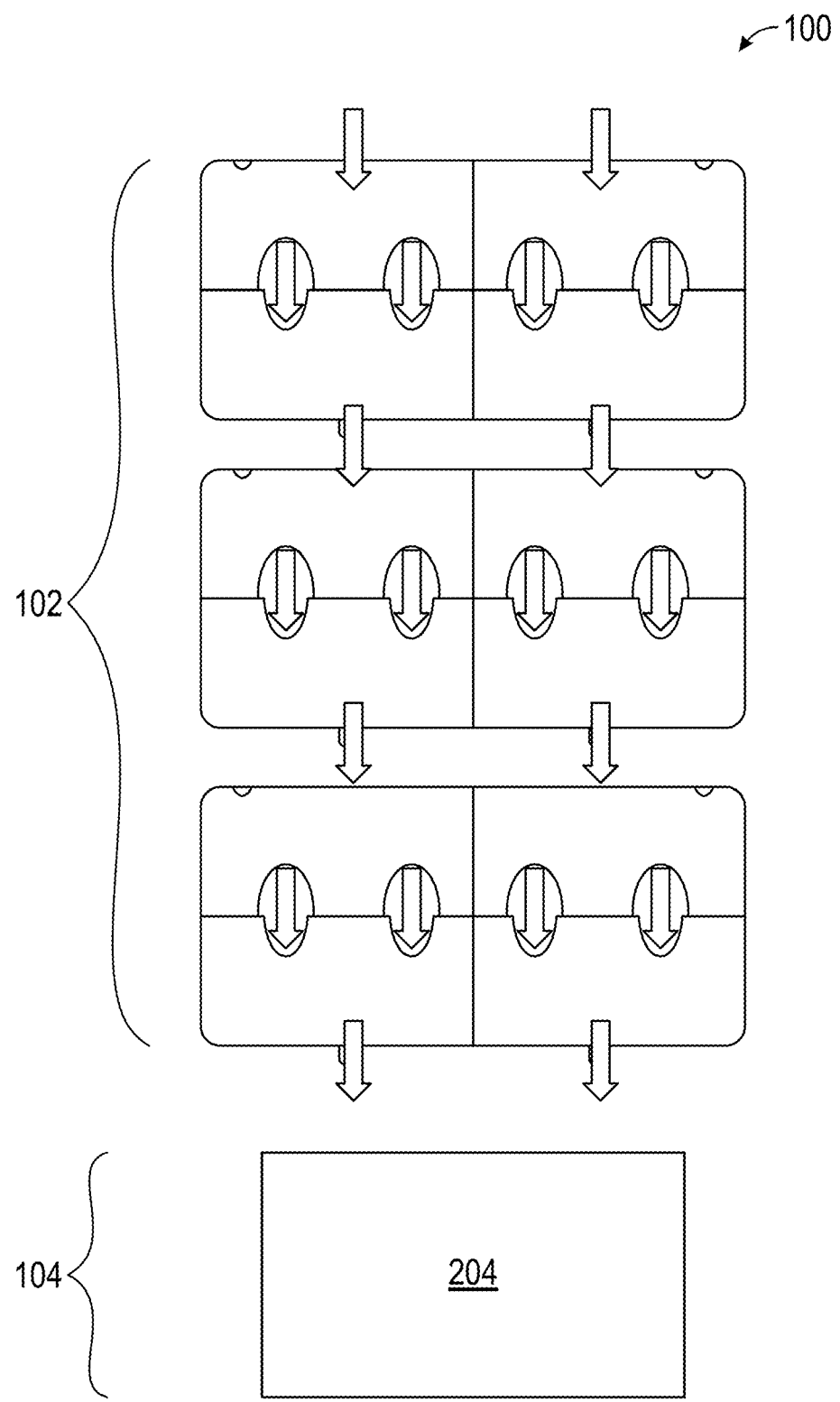
FIG. 14 illustrates a flow diagram, by way of arrows, of water and nutrients when the entire assembly is considered.

FIG. 14 illustrates a flow diagram, by way of arrows, of water and nutrients when the entire assembly is considered.

The TECHNICAL ADVANCEMENT of this invention lies in providing an aeroponics assembly with enhanced modularity, in that, each drawer, containing planter pods, can be, individually, removed for the purposes of cleaning without affecting the entirety of the structure. Furthermore, each drawer has an internal geometry and configuration which minimized water noise and water splash. The enhanced modularity ensures that portions of the assembly can be cleaned in a matter of a few minutes as opposed to a few hours that are required by the prior art. Since maintenance is a key parameter, in vertical indoor gardening structures, so that it can be cleaned with ease, this is an important parameter where this invention scores over the prior art. The incline geometry and noise dampeners ensure that water noise is almost eliminated; which is also a key parameter in vertical indoor gardening structures and which is beneficial for vertical farming systems in indoor community spaces. Furthermore, this invention's structure is such that it supports the lighting system and the irrigation system in a tidy hidden manner that is fundamental to the aesthetic and functionality of the system as a green wall; which is also a key parameter in vertical indoor gardening structures. The modularity of this assembly ensures that it can be expanded/collapsed row-wise and column-wise with ease merely by the addition/deletion of drawer assemblies.

It is to be appreciated that combinations of the different implementation environments are contemplated as being within the scope of embodiments of the invention. One of ordinary skill in the art will realize alternative implementations given the illustrative teachings provided herein.

The terminology used herein is for the purpose of describing particular embodiments only and is not intended to be limiting of the invention. As used herein, the singular forms "a," "an" and "the" are intended to include the plural forms as well, unless the context clearly indicates otherwise. Additionally, the terms "comprises" and/or "comprising," as used herein, specify the presence of stated values, features, steps, operations, modules, elements, and/or components, but do not preclude the presence or addition of another value, feature, step, operation, module, element, component, and/or group thereof.

When an element is referred to as being "mounted on", "engaged to", "connected to", or "coupled to" another element, it may be directly/indirectly on, engaged, connected, or coupled to the other element. As used herein, the term "and/or" includes any and all combinations of one or more of the associated listed elements.

It will be understood that, although the terms first, second, etc. may be used herein to describe various elements, these elements should not be limited to any order by these terms. These terms are used only to distinguish one element from another; where there are "second" or higher ordinals, there merely must be that many number of elements, without necessarily any difference or other relationship. For example, a first element could be termed a second element, and, similarly, a second element could be termed a first element, without departing from the scope of example embodiments or methods. As used herein, the term "and/or" includes all combinations of one or more of the associated listed items. The use of "etc." is defined as "et cetera" and indicates the inclusion of all other elements belonging to the same group of the preceding items, in any "and/or" combinations.

While this detailed description has disclosed certain specific embodiments for illustrative purposes, various modifications will be apparent to those skilled in the art which do not constitute departures from the spirit and scope of the invention as defined in the following claims, and it is to be distinctly understood that the foregoing descriptive matter is to be interpreted merely as illustrative of the invention and not as a limitation.

The invention claimed is:

1. A modular aeroponics assembly comprising:
a base section;
a planter section atop the base section, wherein the planter section includes one or more modular drawers configured to hold planter pods, wherein each of the modular drawers includes,
  a top drawer sub-assembly and a corresponding bottom drawer sub-assembly that fit with respect to each other to form a drawer assembly, wherein the bottom drawer sub-assembly includes,
    a bottom left sub-assembly and a bottom-right sub-assembly, and
    a noise dampener at a base of the bottom drawer sub-assembly, wherein the top drawer sub-assembly includes,
    a left top drawer sub-assembly and a right top drawer sub-assembly, and
    an incline surface extending from a back wall of the top drawer and defining a channel extending from a bottom hole of the top drawer sub-assembly to the noise dampener, and
  planter pods configured to hold plants, wherein the planter pods are aligned along an outwardly angled axis with respect to a vertical axis of a front face of the drawer assembly such that there is a cascaded, channelized flow of water and nutrients, from the top drawer sub-assembly to the bottom drawer sub-assembly through each of the modular drawers, wherein the base section includes a reservoir configured to hold the water and nutrients after the water and nutrients have passed through the modular drawers; and
a modular frame structure configured to ensconce the modular drawers within the modular frame structure, wherein the modular frame structure maintains the assembly vertical when standing on a floor.

2. The modular aeroponics assembly as claimed in of claim 1, wherein the modular frame structure includes one or more repeating parts selected from,
  a horizontal framework forming a top horizontal support and a bottom horizontal support,
  a vertical framework forming a left vertical support and a right vertical support, wherein the horizontal framework and the vertical framework form a box-like framework to receive and support a modular drawer,
  a left arm,
  a right arm,
  a left elongate member, connected from a left vertical support and protruding angularly outwards away from the modular frame structure,
  a right elongate member, connected from a right vertical support, protruding angularly outwards away from the modular frame structure, and
  a handle having a light, wherein the handle is configured to join the left elongate member and the right elongate member.

3. The modular aeroponics assembly of claim 1, wherein the modular drawers are made of polypropylene.

4. The modular aeroponics assembly of claim 1, wherein each of the planter pods is a cup shaped assembly having,
  a lower portion receiving support from a front panel of the drawer sub-assembly and an upper portion protruding outwards and away from the front panel of the drawer sub-assembly,
  a base inside the drawer sub-assembly, and
  a top portion from which plants grow and protrude out of the drawer sub-assembly.

5. The modular aeroponics assembly of claim 1, wherein each of the planter pods has a body with longitudinal slits about a circumference of the body so as to receive the water and nutrients into the planter pods via the slits.

6. The modular aeroponics assembly of claim 1, wherein,
  a bottom side of the top drawer sub-assembly of each of the modular drawers includes a first set of one or more holes, and
  a top side of a bottom surface of the bottom drawer sub-assembly includes a second set of one or more holes collinear with the first set of one or more holes such that water drips from the top drawer sub-assembly, through the collinear sets of holes, to adjacent bottom drawer sub assembly
  the bottom drawer su b-assembly includes a downward protrusion beneath the first set of one or more holes to collect and channel the water and nutrients through a single point, and
  the planter pods are in a line traverse of the water flow from the top drawer sub-assembly to the bottom drawer sub-assembly.

7. The modular aeroponics assembly of claim 1, wherein each of the drawer sub-assemblies includes four planter pods adjacent to each other, wherein two of the four planter pods are on a left side of the drawer sub-assembly and two of the four planter pods are on a right side of the drawer sub-assembly.

8. The modular aeroponics assembly of claim 1, wherein a front face of each of the drawer sub-assemblies is broken into,
  a left side top drawer panel having one or more recesses to hold or provide space for an upper portions of one of the planter pods,
  a left side bottom drawer panel having one or more recesses to hold or provide space fora lower portions of one of the planter pods,
  a right side top drawer panel having one or more recesses to hold or provide space for an upper portion of one of the planter pods, and
  a right side bottom drawer panel having one or more recesses to hold or provide space fora lower portion of one of the planter pods.

9. The modular aeroponics assembly of claim 1, wherein a plurality of the drawer assemblies are stacked one atop another to form a rack assembly.

10. The modular aeroponics assembly of claim Da wherein a plurality of the rack assemblies are stacked side by side to form a multi-rack assembly.

11. The modular aeroponics assembly of claim 1, further comprising:
  shower heads or nozzles on a top panel of a top drawer sub-assembly, wherein the shower heads or nozzles are configured to release the water and nutrients into a first channel at a height in the top drawer sub-assembly, from which the water and nutrients flow to an incline channel connected to an end of the first channel, wherein the incline channel is configured to flow the water and nutrients downward with minimized splashing or flow outside the incline channel to a second set of channels having a left side second channel and a right side second channel originating from a bottom end of the incline channel, wherein the second set of channels is configured to split the water and nutrients received from the incline channel towards corresponding left side holes and right side holes from which the water and nutrients drip into corresponding planter pods below corresponding holes.

12. The modular aeroponics assembly of claim 11, wherein the top drawer sub-assembly includes the first channel and the incline channel, and wherein the planter pods are configured to drip the water and nutrients onto the noise dampeners.

13. The modular aeroponics assembly claim 11, wherein the noise dampener connects to third channels including a left side third channel and a right side third channel configured to flow the water and nutrients received by the noise dampeners towards a set of drainage holes centrally located on a bottom surface of the bottom drawer sub-assembly.

14. The modular aeroponics assembly as claimed in claim 1, further comprising:
a lighting system having lighting cables lined along walls of the modular frame structure and light sources at each drawer assembly to provide lights for plant growth.

15. The modular aeroponics assembly of claim 1, further comprising:
an irrigation assembly configured to distribute the water and nutrients to all the planter pods, in a top-down fluid flow manner by pumping the water and nutrients to a topmost drawer assembly from the reservoir.

16. The modular aeroponics assembly of claim 1, further comprising:
an irrigation assembly configured to distribute the water and nutrients to all the planter pods, in a top-down fluid flow manner, wherein the irrigation assembly includes,
shower heads or nozzles under a top panel of only a topmost top drawer sub-assembly so that the water and nutrient solution reach the topmost drawer sub-assembly and are then channeled toward the lower drawer sub-assemblies while feeding plants in the planter pods, through the incline surface and noise dampener, and
a central pipe through the top and the bottom drawer sub-assemblies, wherein the central pipe is configured to carry the water and nutrients from the reservoir to the shower heads or nozzles of the topmost drawer assembly.

17. A multi-rack assembly formed by a plurality of the modular aeroponic assemblies of claim 1.

\* \* \* \* \*